United States Patent
Murray

(10) Patent No.: US 6,392,668 B1
(45) Date of Patent: May 21, 2002

(54) CLIENT-SIDE SYSTEM AND METHOD FOR NETWORK LINK DIFFERENTIATION

(75) Inventor: Freeman Murray, San Jose, CA (US)

(73) Assignee: Kendara, Inc., Palo Alto, CA (US)

( * ) Notice: Subject to any disclaimer, the term of this patent is extended or adjusted under 35 U.S.C. 154(b) by 0 days.

(21) Appl. No.: 09/439,733

(22) Filed: Nov. 12, 1999

(51) Int. Cl.[7] .............................................. G06F 3/00
(52) U.S. Cl. ........................ 345/738; 705/14; 345/739; 707/501.1
(58) Field of Search ............................. 707/3, 10, 513, 707/104.1, 501.1; 709/218, 217; 345/700, 968, 740, 741, 738, 739; 705/14

(56) References Cited

U.S. PATENT DOCUMENTS

| | | | | |
|---|---|---|---|---|
| 5,754,938 A | * | 5/1998 | Herz et al. .................. | 455/4.2 |
| 5,774,870 A | * | 6/1998 | Storey ........................ | 705/14 |
| 5,794,257 A | * | 8/1998 | Liu et al. .................... | 707/501 |
| 5,946,647 A | * | 8/1999 | Miller et al. ................. | 704/9 |
| 6,055,538 A | * | 4/2000 | Kessenich et al. .......... | 707/101 |
| 6,601,503 | * | 8/2000 | Cooper et al. .............. | 707/104 |
| 6,266,648 B1 | * | 7/2001 | Baker, II .................... | 705/14 |

* cited by examiner

Primary Examiner—John Breene
Assistant Examiner—Susan Rayyan
(74) Attorney, Agent, or Firm—Jeffery Slusher

(57) ABSTRACT

According to the invention, network code (for example, in HTML or XML) corresponding to a displayable portion of network content (such as an Internet Web site) is retrieved into a users' local processing system. A list of identifiers is then stored, by specific user choice, in the local system. Each identifier corresponds to a participating provider. In the user's local processing system, the network code is then parsed and any occurrence in the network code of any identifier stored in the list of identifiers is detected. For each detected identifier, a marker code is then inserted into the network code, the marker code indicating to the user the presence in the network code of each detected identifier. Both the network code and each inserted marker code are then displayed, whereby the presence in the network code of each detected identifier is made visible to the user. The identifiers include network address links and text strings. The identifiers are preferably downloaded into and stored in the user's local processing system from each participating provider via a public network. When a user is viewing network content, the invention can therefore make the user aware, for example, that a particular link or phrase on the page is associated with a participating provider, who may, for example, offer benefits such as price discounts to the user.

8 Claims, 4 Drawing Sheets

CLIENT-SIDE SYSTEM AND METHOD FOR NETWORK LINK DIFFERENTIATION

BACKGROUND OF THE INVENTION

1. Field of the Invention

This invention relates to a system and a method for analyzing documents and images that include network identifiers and for detecting and marking network identifiers of particular known interest to a given user or group of users.

2. Background Art

In almost any industrialized country, it would be difficult if not impossible not to notice the rapid increase in the number and availability of network-based information services. This is especially true in the case of the Internet. Indeed, almost every popular news report involving the Internet makes some mention of how fast Internet-based services are growing.

Unfortunately, along with the rapid growth in the crop of Internet "wheat," there is a corresponding rapid growth in the amount of Internet "chaff." There are at present several different ways of enabling a user to separate these two types of information. The most common way is by using a search engine. As is well-known, the user of a search engine enters one or more keywords, which the engine then matches against the millions of potential available Web sites. Links to relevant Web sites are then presented to the user by means of some conventional browser.

The problem with this solution lies in the word "relevant." What the search engine considers to be relevant is often not at all what the user might consider to be relevant. This is a result not only of the inherent limitations of any search engine, but also of the increasing commercialization of the Web itself. In some cases, for example, a retrieved site may be listed very highly only because the site provider paid the search engine company to put it there. In many other cases, the results of a keyword search may include a large number of advertisements that appear either as banners or as actual sites and whose inclusion is triggered by a particular keyword. To the extent that links to various sites are presented to the user, they are thus chosen based on criteria set either by the provider or by entities associated with the provider. In other words, links to Web sites are differentiated by the provider.

There are also some programs available that allow a user to filter information retrieved from the network, for example, to prevent children from downloading and viewing pornography. Such programs give the user some ability to filter out undesirable information, but they still do nothing to increase the amount of relevant information that is presented to the user. This is in part because these programs also differentiate based on particular pre-defined keywords that are provided to the user's computer.

One well-known shortcoming of existing search engines and Web filters is that they do not incorporate any form of cross-reference to any generalized class of information that is known to be relevant to a given user. This means that the user must be even more skillful when selecting sets of keywords to be used as the basis of a Web search. Assume for example that a user is interested in Scandinavian poetry and wants to learn more about the famous series of poems by Swedish Nobel Laureate (1931) Erik Axel Karlfeldt describing his mythical rustic Swedish hero Fridolin. A simple search using a well-known search engine on the keyword "Fridolin" returned not a single reference to Scandinavian poetry in the list of the first 100 links; the top five links were related to 1) the genealogy of a German man; 2) boomerangs; 3) Saint Fridolin, the founder of a monastery; 4) a technical report on parallel processing; and 5) a race horse.

According to one attempt at helping a user identify relevant information in an Internet Web site, software downloaded into the user's computer analyzes the text in the HTML stream of the Web site. Wherever the software locates a word in the text of the Web site that matches a predetermined keyword list, it highlights this word and presents to the user a small overlaid display window containing network links to sites and site categories assumed to be of interest to the viewing user. For example, if the user is viewing a Web site that includes the phrase "New York, N.Y." then this conventional software generates a display with links to car rental agencies, maps, hotels, and other categories of Web sites assumed to be of interest to the viewer of this Web page.

The problem with this known method is, however, that the assumptions are redetermined by the keyword list included in the software by the provider. Even if this keyword list is updated, whoever views the same Web page will get the same highlighting and same link presentation. One viewer might be interested in traveling to New York City and may actually wish to link to the overlaid sites about available car rental agencies. Another viewer, however, might look upon any potential trip to the Big Apple as a nightmarish ordeal, and links to maps of New York city would be completely irrelevant. No matter how often or "intelligently" the software were to update the keyword list, it would still not be able to ensure relevance to a particular user, since the user is not the one determining the list.

What is needed it is therefore a system and a method that make it easier for a user to identify network links and similar data that is known to be particularly relevant to the user, and lets the user control what the system considers "relevant." Such a system should, however, preferably not require a great deal of user skills and intervention, and it should ideally even identify sites of particular relevance to the user even when the user may not have known about these sites in advance. Unwanted advertisers and other sources of "noise" should not be able to interfere with the presentation of relevant information. In other words, a better system would allow for link differentiation at the client/user side. This invention provides such a system and method.

SUMMARY OF THE INVENTION

According to the invention, network code (for example, in HTML or XML) corresponding to a displayable portion of network content (such as an Internet Web site) is retrieved into a users' local processing system. A list of identifiers is then stored, by specific user choice, in the local system. Each identifier corresponds to a participating provider. In the user's local processing system, the network code is then parsed and any occurrence in the network code of any identifier stored in the list of identifiers is detected. For each detected identifier, a marker code is then inserted into the network code, the marker code indicating to the user the presence in the network code of each detected identifier. Both the network code and each inserted marker code are then displayed, whereby the presence in the network code of each detected identifier is made visible to the user.

The identifiers include network address links and text strings. The identifiers are preferably downloaded into and stored in the user's local processing system from each participating provider via a public network.

When a user is viewing network content, the invention can therefore make the user aware, for example, that a particular link or phrase on the page is associated with a participating provider, who may, for example, offer benefits such as price discounts to the user.

DETAILED DESCRIPTION

Figure 1:
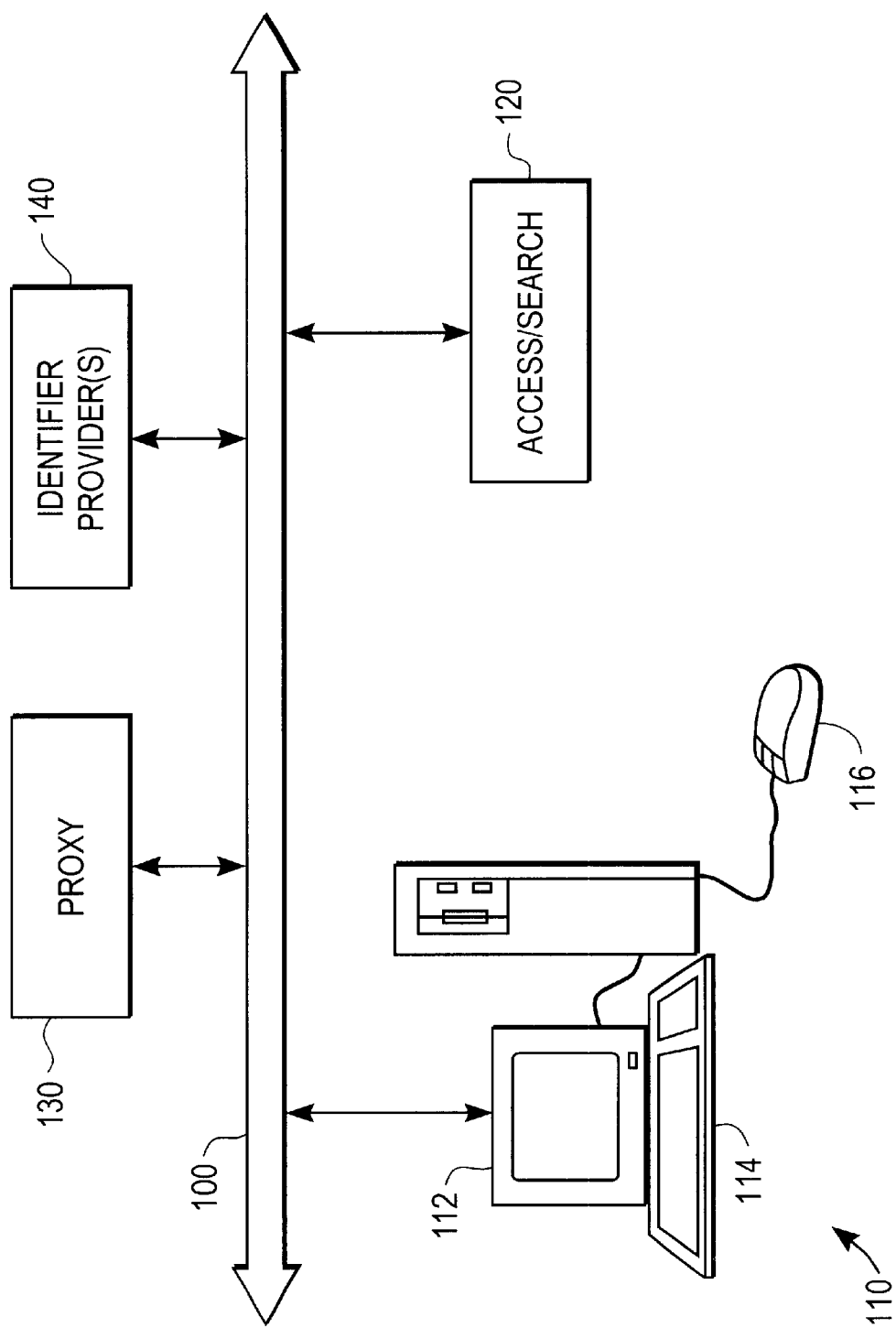
FIG. 1 illustrates the main systems used in the invention.

FIG. 1 shows the main components of the preferred embodiment of the system according to the invention. A user accesses and communicates with a network 100 using a local processing system (computer) 110, such as a personal computer or a terminal that is connected to some central processing system. In FIG. 1, only one local processing system is shown merely for the sake of simplicity. The invention will work—indeed, is most advantageous—even for large numbers of users, each with access to the network 100 using either a dedicated or a shared local computer. As is well known, the local system 110 has a display or monitor 112 and input devices such as a keyboard 114, and a mouse, trackball or similar cursor-control device 116.

In the most common use of the invention, the network 100 will be a wide-area public network such as the Internet. This is also not necessary—the network may be any wide or local area network, and may even be a proprietary network such as the intra-networks found in many companies. These intra-networks may in turn be connected through conventional gateway servers to the public network.

Also in the most common application of the invention, the user/client will use an access provider and search engine 120 to access, search for and retrieve information available via the network. The access provider and search engine 120 may of course be separate systems and may be either generally and freely accessible and available via the network, or proprietary and accessible only by subscription. These arrangements are well known and are therefore not described further. The only requirement according to the invention is that the user/client should be able to download via the network (or otherwise retrieve) or load and display within her own local processing system some form of network or network-related content such as, in the Internet context, Web sites or electronic mail.

Users preferably download into their respective local computers 110 the software defining this invention from a server such as the proxy 130 that is connected to the network 100. Such downloading of software is commonly done and well understood. Software downloading is not necessary, however, to use the invention: the invention may also be provided to users on a physical medium such as a CD ROM disk, which they then load in the conventional manner into their respective systems.

It is not necessary for each local computer 110 to be connected directly to the network 100. Rather, as long as these local systems are able to access the network and retrieve content such as Web pages, then they may also be connected to the network via a proxy or similar intermediate server. The "local" system would then encompass both the local computers and the intermediate systems. This configuration might be found, for example, in an organization where the local computers are all connected to the public network 100 only via an in-house server.

According to the invention, a list of identifiers is preferably loaded into or otherwise made readily accessible to the user's local processing system. These identifiers are then matched against the network content that the user is reviewing. If the content includes any of the identifiers, then the invention makes the user aware of the match. In the preferred embodiment of the invention, the identifiers are links to addresses of network-accessible information. Where the network 100 is the Internet, these links will typically be Uniform Resource Locators (URL's). Alternative identifiers are described below. For example, a "link" may also be some pre-determined text or phrase that uniquely identifies a benefit provider sufficiently that a user can then contact the provider off-line if he wishes. In any case, it is assumed that at least one entity provides the user with a computer-readable list of identifiers that are associated with one or more classes of criteria known to be relevant to that particular user.

In FIG. 1, the provider of identifiers is shown as a separate system 140 connected to the network 100. The user's local processing system 100 can then download the list (or a current, updated list) of identifiers via the network 100 either by user command, or automatically, according to a predetermined schedule. Downloading information via a network such as the Internet is well known, and any conventional method may be used. Retrieving the identifier list(s) via the network 100 will in most cases be the most convenient method, since it is easily automated and requires minimal user involvement. Identifier lists may, however, also be delivered to the user on some machine-readable, physical medium such as a memory disk (at present, a magnetic "floppy" disk or a CD-ROM disk) and loaded into the memory of the user's processing system 100 in any conventional manner.

It would also be possible according to the invention for the proxy system 130 to be the site at which the identifier list resides. The user could then access the proxy 130 to download the most recent list. Such an arrangement would make it easier to update the lists, since it could be done "centrally" for all users who connect to the proxy 130, but would make it somewhat more inconvenient for some users, since they would have to access the proxy system to be able to update or use the particular user's identifier list. Even in these cases, note that the system 130 and the user's local computer would both be on the "client" side of the system as a whole since neither would be under the direct control or influence of any third party such as a particular provider or advertisers. Note, however, that as long as the local computers 110 are loaded with the various software modules defining this invention (either by downloading, or physically), and are able to access the network and retrieve network content, then the invention can be practiced successfully without any proxy system 130 at all.

Retrieving the software modules according to the invention by downloading from a central source, although not is preferred, however, since this will make it much easier for users to get it—it is almost always easier simply to download software than it is to have to order or buy software by telephone or by going to a store.

In FIG. 1, only one provider of identifiers 140 is illustrated. This is, as before, merely for the sake of simplicity. Any number of identifier providers may be connected to the network 110 or otherwise be included in the system according to the invention. In most applications of the invention, many different identifier providers will be included, with different permutations of these providing their respective identifier lists to different users.

Figure 2:
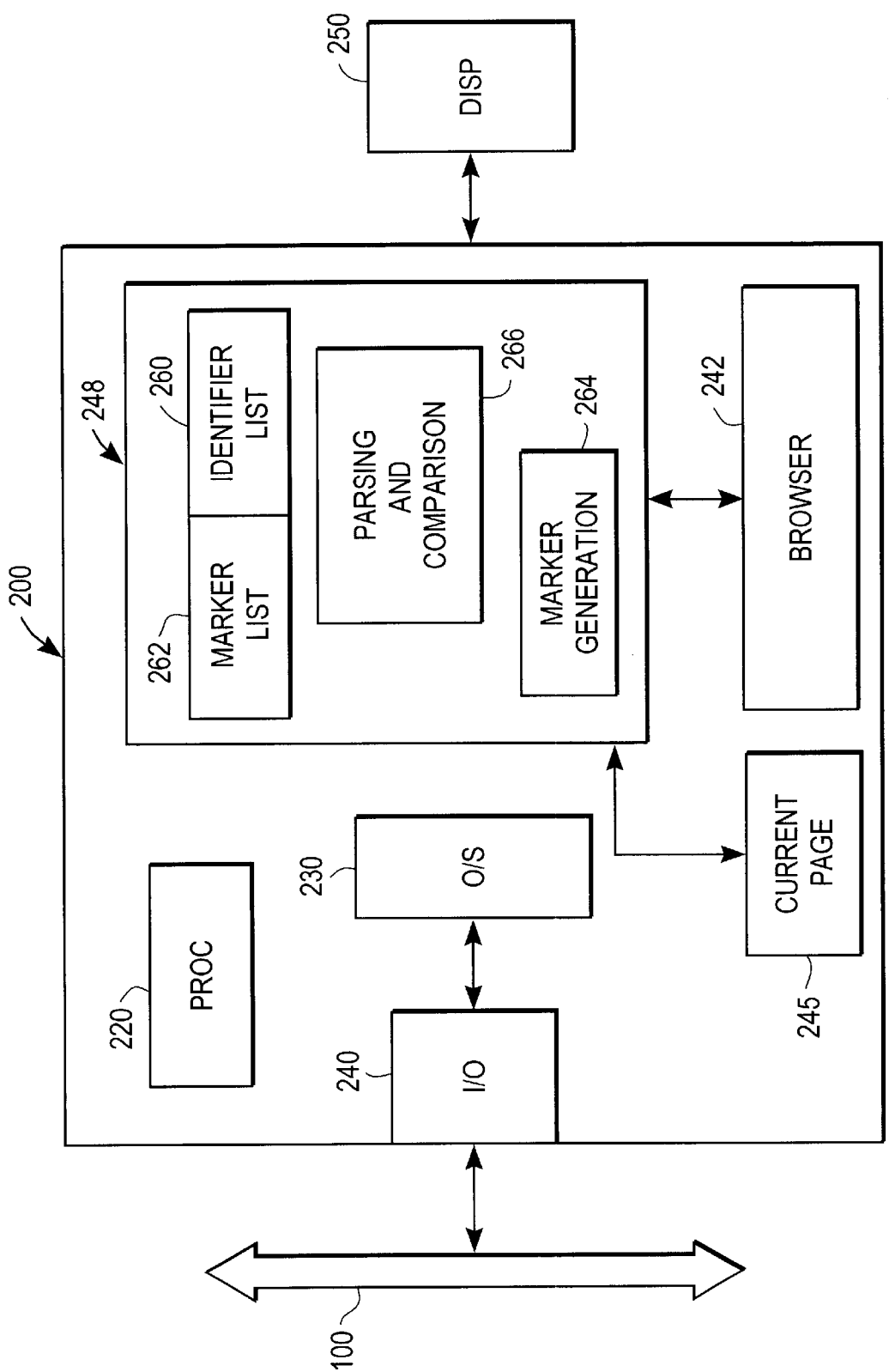
FIG. 2 is a simplified block diagram illustrating the main hardware components and software modules used to implement the invention.

FIG. 2 illustrates the main hardware components and software modules included in the local processing system 110 according to the invention. The local processing system includes a processor 220, which may be of any known type, such as a microprocessor. A conventional operating system 230 allocates memory and other system resources such as an input/output (I/O) unit 240, via which the system is connected to the network 100. The I/O unit may be any known device, such as a modem or other network access device. Other standard hardware and software components such as memory and various device drivers are also included, but are not shown since their use and function are well known.

A browser and/or electronic mail (e-mail) software module 242 is also included in each local processing system 110. As is well known, a browser is a software module that enables a user to view and conveniently access network content, such as Web sites. The browser receives the "stream" of information that is transferred to the system 110 via the network 100, and then converts it into a viewable form. The information may include simple text, graphics files, executable code such as Java "applets," etc., and usually includes a combination of such information types. At present, the two most commonly used browsers are Internet Explorer by the Microsoft Corp., and Netscape Communicator, by the Netscape Corp.

Similarly, as is well known, once a user's local processing system is connected to the network 100 and is communicating with a network service provider with whom the user has an e-mail account, the e-mail software allows the user to access, download, view and respond to e-mail. Of interest here is that e-mail, just like a viewable network information site (such as an Internet Web site), is a stream or collection of data whose content is stored and can be parsed, that is, analyzed into elements. E-mail data is, as its name implies, mostly text, but it may also include highlighting effects such as underlining, shading, color changes and blinking, graphics such as logos, drawings, animation and photos, hypertext links to network sites and other e-mail addresses, etc., all of which are represented and transferred using a standard language and protocol.

The stream of network information, be it Web site information or e-mail, is encoded using any (or any predetermined combination of) standard formats, such as the hypertext mark-up language (HTML), the extended mark-up language (XML), or some other predetermined, known format. The information itself is transferred to each local processing system, and thus to the browser, according to any of several different protocols, such as the common hypertext transfer protocol (http), the file transfer protocol (ftp), etc. Transferred ("downloaded" or pre-stored) data is stored in some memory portion, for example the portion 245 marked "current page," under the control of the operating system and is then made available to the browser for de-coding and presentation on the display. The current page memory block 245 may be either a current, temporarily cached data set corresponding to a just downloaded Web site (or other network information site), or to a previously or separately stored file of information that the browser opens for display. Transfer protocols and browsers are well known and are thus not described in greater detail; furthermore, both of these concepts are constantly being developed and revised.

The invention does not depend on the use of any particular browser or protocol. The only aspects of these components that are essential to the operation of the invention are the following: 1) some software module such as a browser or equivalent software should be included to present network content to a user; 2) the stream of received or pre-stored network information (content) used in the presentation should be available (usually, stored in memory under the direction of the operating system) in a predetermined language or similar format so that the content can be parsed and its various elements (such as words) can be compared with predetermined identifiers; and 3) it should be possible for the software modules unique to this invention (described below, labeled collectively 248 in FIG. 2) to insert graphics and text into the display.

A conventional display driver arrangement 250 is also included to convert each current page of information, for example, that is contained in the memory block 245 to be displayed to the user into a form suitable for driving the monitor 112. This circuitry is also well known.

In addition to the known hardware components and software modules described above, the invention also includes a memory portion 260 in which the identifier(s) provided by each provider 140 is stored. Associated with each stored identifier is also one or more markers, as is explained in greater detail below. A marker may be simple text, a graphic (with or without text) such as an icon, a code indicating highlighting, banner-creation, color changing, dynamic effects (such as blinking), or any combination of these or similar devices that draw a viewer's attention to an particular portion of a displayed screen of network information. A marker may also include explanatory text, such as the percent of discount or type of benefit offered by a particular provider. This is illustrated below. A marker generation software module 264 is preferably included to insert code corresponding to a selected marker into the current page data stored in the memory portion 245. This code insertion may be done using any conventional technique, and will be made clearer in the examples of the use of the invention described and shown below.

A parsing and comparison module 266 is also included as a software module in the invention. This module, which may be coded in any known language such as Java, C++, etc., using conventional techniques, scans or "parses" the current page stored in the memory portion 245 and compares the scanned content with each identifier stored in memory block 260. For each match, the module 262 then selects the corresponding marker (including any explanatory text associated with the matched identifier) from the list 262. The marker generation module 264 then inserts the marker, along with coordinates indicating proper display position and other parameters indicating colors, dynamics (such as blinking), etc., into the current page memory 245. Any of the different conventional techniques for inserting text, formatting codes and graphics into, for example, an HTML or XML stream may be used to implement marker generation and insertion into the current page.

Alternatively, the module 266 can parse an incoming stream of network content (for example, the HTML or XML stream) as it is being downloaded into the local system 110, perform the identifier comparison, and insert marker information into the stream as it is being passed to the browser. In either case, the browser 242 will then decode each marker and its display parameters as any other part of the page, and cause it to be displayed along with the current page.

Parsing of a stream of network content being downloaded, or already stored, may be done in any known manner. Assume for example that the user is downloading a standard HTML Web site. If he is using the browser Internet Explorer 4 or 5, then this browser includes an application program interface (API) that gives other software modules (such as the parsing and comparison module 266) access to the entire page. The command GETTEXT then returns a string that includes the entire text of the page; the command GETLINKS returns all network address links in the HTML stream. Other browsers such as Netscape include similar features allowing access to the page for parsing and comparison. Future browsers are expected to have similar, and probably even more convenient, commands that enable parsing.

An alternative method may be used for accessing and parsing the HTML (for example) stream if the server via which the user's local processor is connected to the network is the proxy server 130. In this case, the proxy may use known techniques to evaluate the underlying TCP/IP stream and extract links, which are then passed to the user's local processing system 110.

In FIG. 2, the various memory and software modules 260, 262, 264, 266 used by the invention are shown as being separate from the browser 242. This is not necessary; rather, any or all of the these memory regions and modules may be incorporated into or allocated to the browser itself.

The method of operation according to the invention may perhaps be best understood by considering some examples. The example that will illustrate one application of the invention with perhaps the greatest potential for wide-spread use relates to membership benefit programs. In such programs, members receive benefits such as discounts either for the goods and services of the program sponsor itself, or of some associated sponsor. For example, members of an automobile club often receive discounts at certain hotels or hotel chains, or discounts on car parts and services; members of an airline's frequent flier program receive discounts or free upgrades on car rentals; members of certain professional or trade organizations occasionally receive discounts on travel on certain airlines; members of university alumni organizations occasionally receive discounts on insurance premiums with certain carriers; and so on. Typically, membership in the benefit program of one sponsor provides benefits with several other providers. For example, several different hotels and rental car agencies often offer rebates to members in an airline's frequent flier program.

In all of the examples of benefit programs just mentioned, the benefits are secondary to the main business of the benefit provider. Other companies have sprung up, however, whose main business is running discount programs: Consumers pay specifically for a membership in these programs, which are often arranged by city or region. In exchange, they receive a card that is honored by a large number of hotels, restaurants, museums, etc. in that region, as well as a catalog that lists the various establishments in the region who have agreed to participate in the program and who honor the card. When the member presents the card at one of the listed establishments, say, a restaurant, then that restaurant gives the member a price discount or other benefit. Common to all of these benefit programs is that the company providing the principle service or goods to the user has entered into some form of agreement with one or more third-party providers to offer discounts or other benefits to the member/user.

Something else common to these benefit programs is that it is often difficult or impossible for their users/members to be aware of all or even most of the possible third-party vendors and other providers who offer discounts. In some cases, for example, there can be scores of restaurants in any given city that offer discounts. Furthermore, not all hotels (or restaurants or rental car stations, etc.) in a chain may be participating in a discount program, so that the list of the ones that do can sometimes run into the hundreds. Moreover, even if the user could be given a complete list of participating third-party vendor/providers, then the list would almost certainly change before the next publication of the list, for example, as new vendors join.

According to the invention, identifiers for each participating third-party benefit provider are delivered to the user's local processing system 110 by the identifier provider 140, and are stored either in the memory block 260, or in the proxy system 130. Whenever the user then views a page of network content, any address links, phrases, or words that match any identifier in the stored list(s) will be marked so that the user will be made aware of them.

One advantage of using links as identifiers is that the user can then, using conventional browsers, "click on" them, that is, select a link using the cursor-control device 116, whereupon the browser will automatically access the site corresponding to the selected link. This allows the user to quickly and conveniently retrieve more specific information about the participating provider whose link has been marked.

Using words or phrases (as opposed to hypertext address links) as identifiers, however, may alert the user to benefits offered by third-party participants in the program that are too small or that for some other reason do not have their own network sites, such as individual restaurants. For example, a user might be reading an on-line review of restaurants. If the name of a particular restaurant is mentioned in the review, and if that restaurant participates in the user's selected discount program, then the invention will insert a marker into the viewed page to call the user's attention to this fact. The user can then contact the restaurant in conventional ways off-line.

Figure 3:
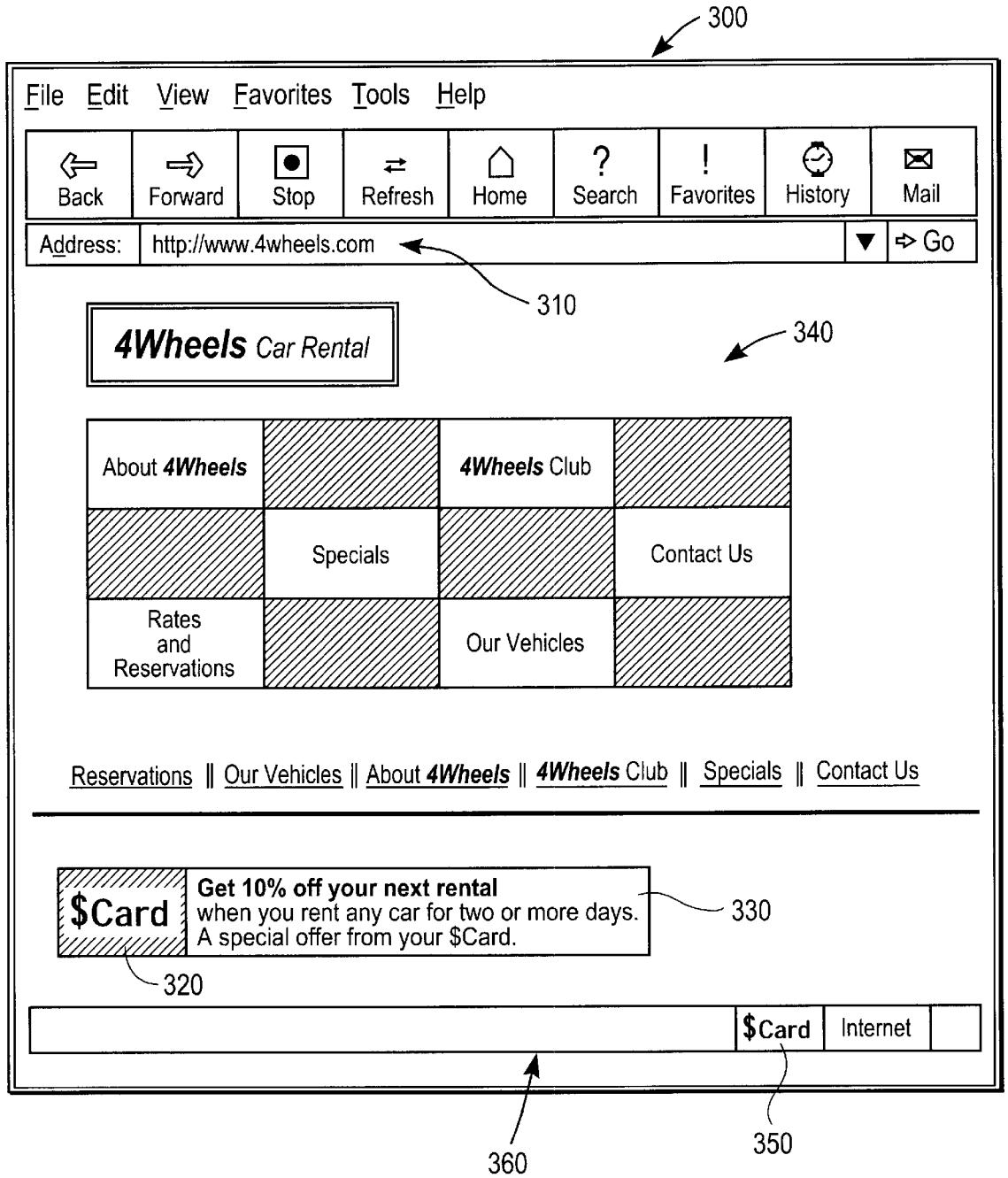
FIG. 3 is a simulated display of a site showing the network presence ("Web site") of a hypothetical company that is participating in a benefit program, and also showing how the system according to the invention identifies and marks this in the display in order to draw a user's attention to this participation.

FIG. 3 illustrates one example of how the invention could be used in practice. Assume for the sake of this example that a user has joined some program (for example, an airline's frequent flier program, or a special discount subscription program) whose provider has entered into contracts with several restaurant, hotel and car rental chains such that members of the program receive various discounts, upgrades, and so on. Assume that the name of this program is "$Card." The user will first have installed into his local processing system the various software components 248 according to the invention. He will then load (for example by downloading over the network 100 from a $Card server) from one of the possible identifier providers 140 the list of identifiers and markers (such as Web addresses or text and an $Card marker logo) associated with the $Card program into his system in memory blocks 260, 262. It would also be possible for the markers to be downloaded separately from their corresponding identifiers. For example, each third-party provider 140 might provide the list of identifiers, with the proxy system 130 providing the corresponding markers.

Note that the user will not even need to know what third-party vendors give discounts or other benefits to $Card members—rather, this information will be contained in the identifier list 260. The user will, however, definitely want to know about such benefits, since he will have signed up for or otherwise voluntarily accepted membership in the $Card program. In other words, whatever identifiers are included in the list 262, they are of at least potential interest and relevance to that particular user.

Assume by way of example that the network 100 is the Internet. Assume also that the user plans to travel and that he checks the network for information about various car rental agencies. Assume further that one of the agencies' Web sites that he views, either as a result of a search or by having directly entered its URL, is the site of the hypothetical "4Wheels Car Rental Company." FIG. 3 illustrates what a typical browser screen display 300 of such a Web site might look like.

The address of the current site is, as is conventional, displayed in an address field 310. This means that the address—in this case http://www.4wheels.com—is also included in the HTML stream in the current page memory block 245 and will be accessible to the parsing and comparison module 266. Now assume that the 4Wheels company does provide discounts or upgrades to members of the $Card program. The identifier "www.4Wheels.com" (if an address link is used as the identifier) and/or the text "4Wheels" or "4Wheels Car Rental" (if a text link is used) or some similar unique identifier will therefore be stored in the identifier list 260. Upon parsing the HTML stream, the parsing and comparison module 266 will therefore find a match with the identifier for 4Wheels Car Rental. The module 266 then selects the marker corresponding to 4Wheels from the list 262 and directs the marker generation module 264 to insert the marker into the HTML page so that the marker will be displayed.

In FIG. 3, the marker for the 4Wheels provider includes both an $Card logo 320 and an explanatory text field 330. In FIG. 3, the marker is a banner added at the bottom of the page, below the display portion 340 corresponding to the actual address, that is, the "default" display. Of course, banners, bubbles, icons or other display features may be inserted anywhere in the display. Banners above or below the default displayed portion 340 will often interfere the least with the rest of the display, especially when the identifier is the actual address 310 of the site being viewed, since the system can then assume that the entire viewed page is related to the identifier. FIG. 3 also illustrates another way of indicating that the displayed page, either exclusively or only in some portion, identifies a provider who participates in the discount program: The $Card logo has also been included as a field 350 on a conventional application bar 360.

Figure 4:
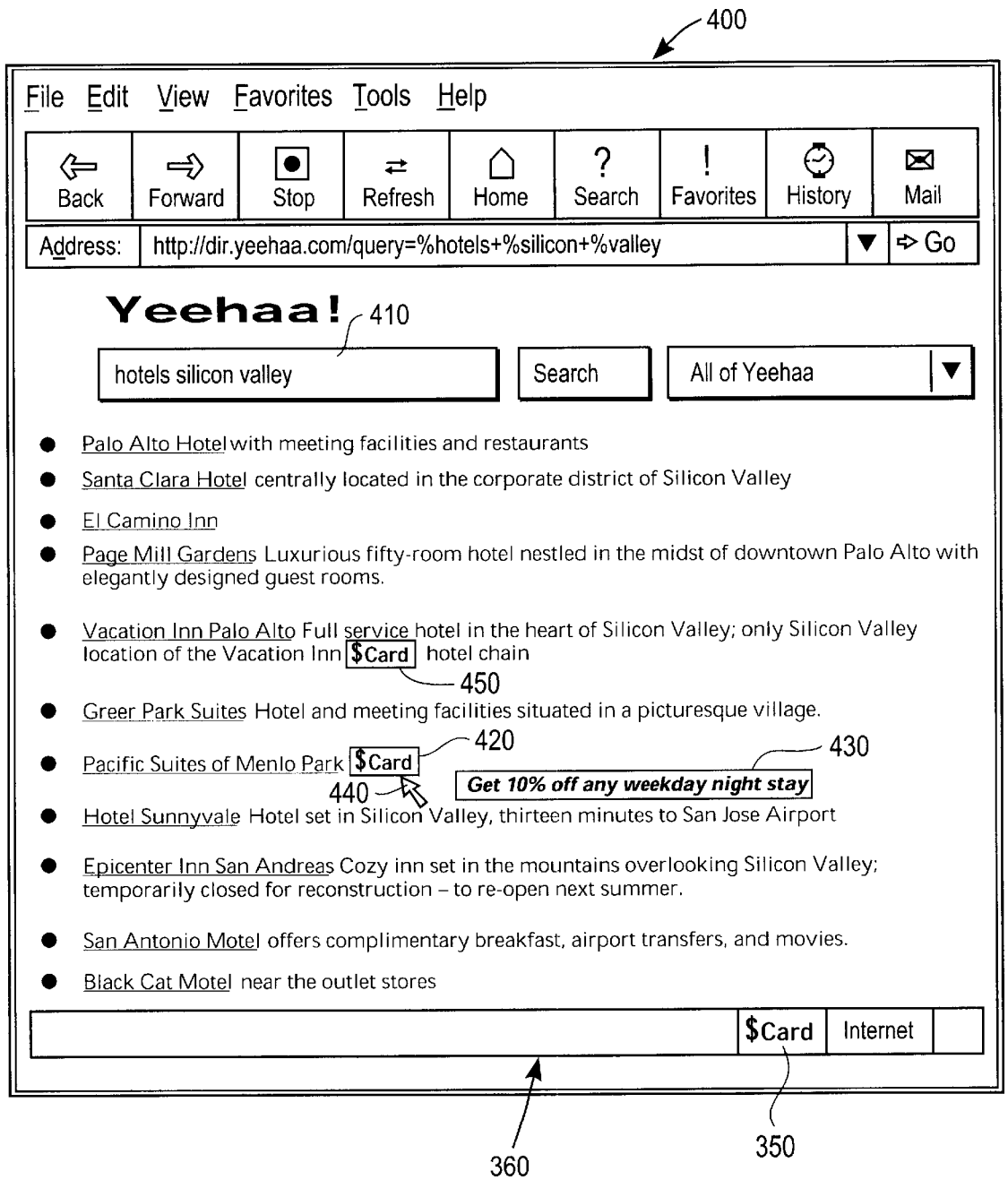
FIG. 4 illustrates alternative methods according to the invention for marking for a user is attention relevant portions of a Web site containing links to many different entities.

FIG. 4 illustrates a different example of link differentiation in the local processing system. In the illustrated case, the user has used a hypothetical conventional Internet search engine Yeehaa! to look for hotels in Silicon Valley. A hypothetical results screen 400 thus includes a query keyword field 410, as well as a list of "hits," that is, hypertext links corresponding to the network addresses the search engine returned in response to the query keywords. Assume that the hotel "Pacific Suites of Menlo Park" is a benefit provider in the $Card system, so that this Web address is included in the identifier list 260. The parsing and comparison module 266 will therefore detect this address in the HTML code that defines the displayed screen. It then adds into the code a marker—in the illustrated case, a small icon 420—signaling that "Pacific Suites of Menlo Park" is a participant in the $Card discount program.

It would of course be possible to insert into the display an explanatory text along with the icon 420. Especially in lists of different sites, or where there is a high percentage of the screen covered with content such as text (which can be detected using normal methods), it would often be obtrusive to generate the explanatory text as a "permanent" overlay on the display screen, that is, a display field that obscures the unmarked display but that the user cannot easily eliminate in order to be able to view the underlying, original display.

According to the invention, in such cases, the marker generation module 264 preferably displays the explanatory field as a "tool tip," that is, a text box that is displayed only when the user maneuvers a cursor 440 to point at the smaller generic icon 420 (or at the hypertext link), which may remain permanently displayed, and possibly only when or as long as the user "clicks" or otherwise specifically selects tool tip display, for example by pressing a designated button of a computer mouse. The generation, display and control of display devices such as tool tips are well-known concepts and any known techniques may be used to implement this feature in the invention.

Assume now that the $Card is also accepted for discounts by the Vacation Inn" hotel chain, but that this hotel chain does not have its own network presence, that is, its own Web site. If the text string "Vacation Inn" is included in the identifier list 260, then the parsing and comparison module 266 will still be able to detect it in the HTML stream as well, for example by using the GETTEXT command in Internet Explorer and comparing the retrieved text with the text string identifiers in the list 260. The invention then inserts a marker icon 450 into the HTML code adjacent to the "Vacation Inn" text string so that the user will be made aware that even this vendor provides a benefit to $Card members.

If it is preferred not to obscure any part of the displayed screen, then the marker used to signal participation in the benefit plan could be arranged through display formatting alone. For example, the corresponding text could be highlighted by changing its color, or its background color could be changed, or it could be made to blink, etc. In this case, some indicator should be included in some noticeable portion of the display screen reminding the user what the formatting change signifies. One way to do this would be to generate the logo 350 on the application bar 360 with similar formatting. Other marking methods will of course also be obvious to those skilled in the art of graphical user interface design.

In FIGS. 3 and 4, only markers for a single program provider ($Card) are shown. This is of course merely by way of example. If the user is in different benefit programs, for example, an airline's frequent flier program as well as an auto club, and if both of these programs have provided lists of identifiers to the user, along with their respective markers, then different markers could be displayed on the same page, even for the same matched identifier. In such case, either all markers can be displayed for the particular match, or some other predefined icon, along with, for example, a pull-down menu of explanatory texts, could be generated and displayed.

In parsing the current page (which may of course comprise many screens worth of displayable content), it is not necessary to require an exact match between an identifier and some text string or address link within a current page. According to the invention, an identifier may also include one or more "wildcard" characters, such as *, for both address and text identifiers. For example, an identifier "www.northwesternhotels.com/*" would match not only "www.northwesternhotels.com," but also every sub-site to this main address.

Note also that several different users could use the same local processing system, participate in different programs (or none at all), and still enjoy the advantages of the invention. In this case, the system would maintain separate identifier and marker lists for each user, and would parse only to find matches with identifiers in the list of the current user.

Several different methods are disclosed above for identifying third-party participants in a predetermined program while a user is looking at network content that is itself not necessarily associated with the program in any way. Common to all of these, however, is that differentiation of the information making up the content the user is viewing is carried out in the user's own local processing system (or on the proxy server 130). In other words, differentiation of the links (including the concept of non-address text), is carried out on the client side of the system rather than at the side of some provider such as an advertiser. As such, the information that is marked for the user's attention is pre-selected to be relevant to that particular user; the system itself according to the invention adds no "noise," that is, information that the user did not ask for. Notice that the system according to the invention is able to differentiate based on entire classes of criteria that are known to the user, even if the user will probably not know many or any of the specific criteria in advance. As such, the system according to the invention is able to identify relationships between providers that are relevant to the particular user, but that the user may not have been aware of at all.

In the description above of the various uses of the invention, it has been assumed that each identifier corresponds to some user benefit provided according to some benefit program in which the user has enrolled, either directly or by accepting enrollment as the result of membership in some other program. The concept of "benefit" is not limited to monetary benefits such as discounts, free upgrades, and the like. Rather, a benefit may also be informative or educational. For example, may people are members of a consumer testing association, such as Consumer Reports (for general consumer goods) or Practical Sailor (for boats and marine products). Similar organizations exist for many other types of good and services; even regular advertisement-based magazines often have product reviews. The invention may be used to advantage even in such situations.

Consider the following example. Assume that the user is a subscriber to such a product-testing organization. That organization could then provide a list of identifiers corresponding to the manufacturer's network address links and/or product names of products that the organization has tested and reviewed. If the user then happens to be searching the network for information about, say, printers, and if the identifier of a particular printer is detected in the code of the current Web page, then the system according to the invention would insert the logo or marker of the testing organization in the display to indicate, for example, that the printer was reviewed. The explanatory text associated with the marker could include such information as which issue of the testing organization's publication contained the review, an address link to a copy of the review if such is available on-line, a summary of the review, such as a rating, or other text or symbols notifying the user that information about the product is available.

I claim:

1. A method for displaying network content comprising the following steps:

retrieving into a users' local processing system network code corresponding to a displayable portion of the network content;

storing, by specific user choice, a list of identifiers, each identifier corresponding to a participating provider;

in the user's local processing system, parsing the network code and detecting any occurrence in the network code of any identifier stored in the list of identifiers;

inserting marker code into the network code, the marker code indicating the presence in the network code of each detected identifier; and generating a display corresponding to both the network code and each inserted marker code, whereby the presence in the network code of each detected identifier is made visible to the user.

2. A method as in claim 1, in which the identifiers include network address links.

3. A method as in claim 1, in which the identifiers include text strings.

4. A method as in claim 1, in which the identifiers are downloaded into the user's local processing system from each participating provider via a public network.

5. A method as in claim 1, in which each marker code identifies for the user a predetermined benefit provided to the user by the corresponding participating provider.

6. A method as in claim 1, in which the list of identifiers is stored in the user's local processing system.

7. A method for displaying network content comprising the following steps:

retrieving into a users' local processing system network code corresponding to a displayable portion of the network content;

storing, by specific user choice, a list of identifiers in the user's local processing system, each identifier corresponding to a participating provider;

in the user's local processing system, parsing the network code and detecting any occurrence in the network code of any identifier stored in the list of identifiers;

inserting marker code into the network code, the marker code indicating the presence in the network code of each detected identifier; and generating a display corresponding to both the network code and each inserted marker code, whereby the presence in the network code of each detected identifier is made visible to the user;

in which:

the identifiers include network address links and text strings;

the identifiers are downloaded into the user's local processing system from each participating provider via a public network; and each marker code identifies for the user a predetermined benefit provided to the user by the corresponding participating provider.

8. A method for notifying a plurality of users via a network of the availability of predetermined benefits provided by a plurality of benefit providers, each benefit provider being a participant in at least one benefit program, the method comprising the following steps:

associating with each benefit provider at least one identifier;

for each user:

storing in a local computer of the user, by specific user choice, a list of identifiers corresponding to the benefit providers associated with each respective benefit program in which the user is enrolled;

whenever the user accesses a segment of network content using the user's respective local computer, retrieving into the local computer network code corresponding to a displayable portion of the accessed network content;

in the user's local computer, parsing the network code and detecting any occurrence in the network code of any identifier stored in the list of identifiers;

inserting marker code into the network code, the marker code indicating the presence in the network code of each detected identifier and indicating the availability of a benefit; and generating a display corresponding to both the network code and each inserted marker code, whereby the presence in the network code of each detected identifier and the availability of an associated benefit is made visible to the user.

* * * * *